United States Patent [19]

Cullen et al.

[11] Patent Number: 4,464,261

[45] Date of Patent: Aug. 7, 1984

[54] ADSORBENT DEVICE

[75] Inventors: John S. Cullen, Buffalo; Samuel A. Incorvia; James A. Vogt, both of Tonawanda, all of N.Y.

[73] Assignee: Multiform Desiccants, Inc., Buffalo, N.Y.

[21] Appl. No.: 402,757

[22] Filed: Jul. 28, 1982

[51] Int. Cl.³ .............................................. B01D 15/00
[52] U.S. Cl. ...................................... 210/282; 55/387; 210/DIG. 6
[58] Field of Search ................. 55/387; 210/232, 282, 210/287, 484, DIG. 6, DIG. 7

[56] References Cited

U.S. PATENT DOCUMENTS

| | | | |
|---|---|---|---|
| 3,715,035 | 2/1973 | Teeple et al. | 210/282 |
| 3,734,296 | 5/1973 | Proctor et al. | 210/288 |
| 4,111,813 | 9/1978 | Preus | 210/282 |
| 4,116,649 | 9/1978 | Cullen et al. | 55/387 |
| 4,187,695 | 2/1980 | Schumacher | 62/503 |
| 4,199,960 | 4/1980 | Adams et al. | 62/503 |
| 4,276,756 | 7/1981 | Livesay | 62/503 |
| 4,291,548 | 9/1981 | Livesay | 62/503 |

Primary Examiner—Ivars C. Cintins
Attorney, Agent, or Firm—Joseph P. Gastel

[57] ABSTRACT

An adsorbent device including a casing having a substantially semi-cylindrical wall for placement against spaced parallel pipes in a refrigerant receiver and a planar wall secured to the semi-cylindrical wall for placement next to another pipe spaced from the spaced parallel pipes so that the casing lies between the spaced parallel pipes and the other pipe, adsorbent in the casing, a tab formed integrally as an extension of the casing walls, and an aperture in the tab for receiving a strap for attachment to the tab to a pipe joining the spaced parallel pipes.

12 Claims, 7 Drawing Figures

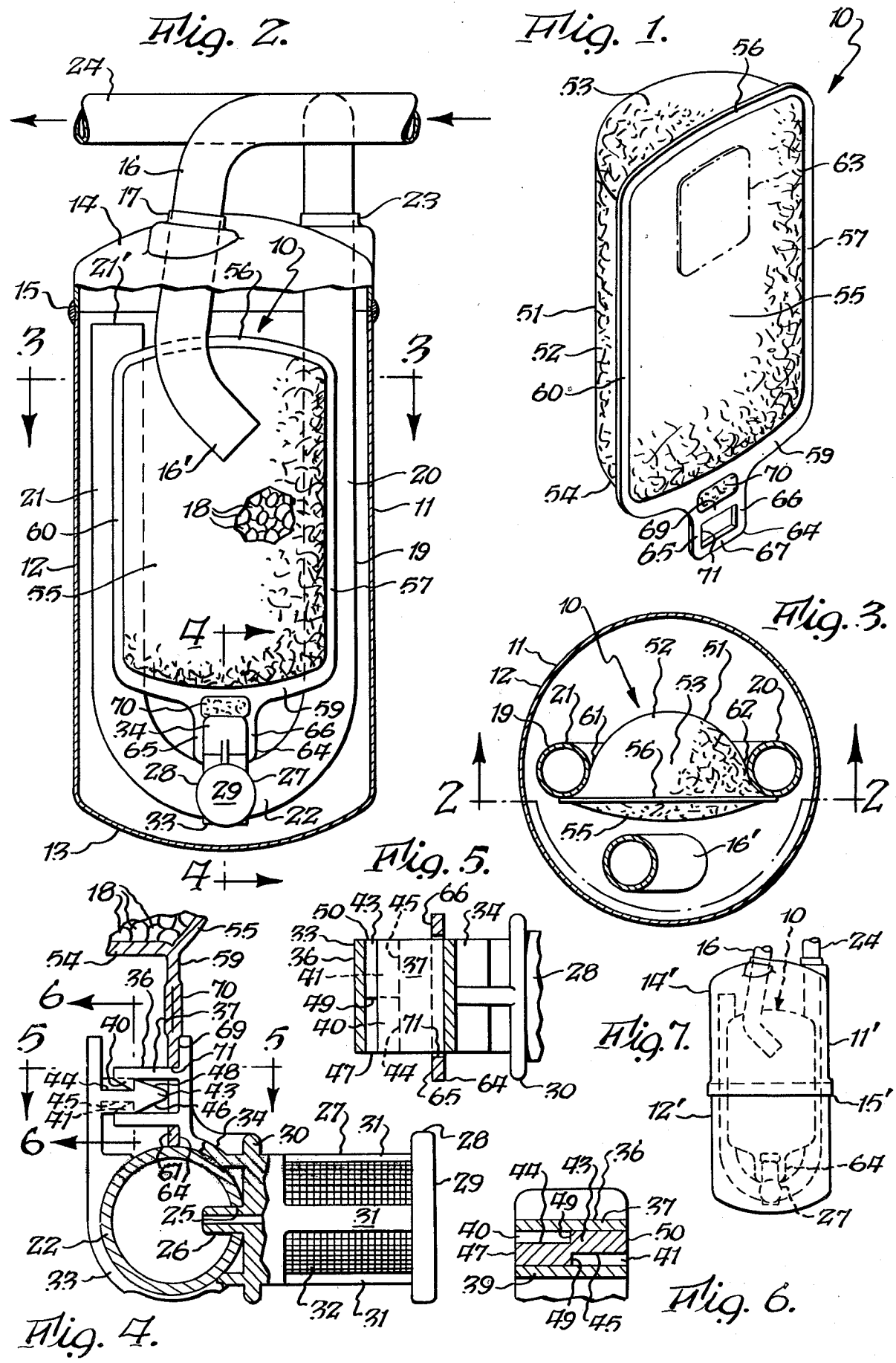

ADSORBENT DEVICE

BACKGROUND OF THE INVENTION

The present invention relates to an improved adsorbent device adapted to be mounted in the receiver of an automotive air conditioning system.

By way of background, it is common practice to place an adsorbent device in the receiver of an automotive air conditioning system to adsorb undesirable substances from the refrigerant. In the past there were numerous ways of fixing the adsorbent device in position, such as by means of flaps and harnesses, which were secured to a pipe in the refrigerant receiver. Usually the flaps or harnesses had to be attached to the refrigerant pipes by threading the pipe through an aperture in a flap attached to the casing of the adsorbent device, thereby requiring extra labor. Devices of this type are shown in U.S. Pat. Nos. 4,178,695, 4,199,960 and 4,116,649. In addition, the flaps of prior devices were usually a separate member which was attached to the adsorbent casing by a separate labor step which increased the cost of the device. It is with providing an improved adsorbent device which obviates the foregoing deficiencies that the present invention is concerned.

SUMMARY OF THE INVENTION

It is accordingly one object of the present invention to provide an improved adsorbent container which has a mounting tab formed integrally therewith so that it can be fabricated without the additional cost required for fabricating an adsorbent device with a separate flap.

Another object of the present invention is to provide an improved adsorbent container for a refrigerant receiver which is maintained in position between the pipes within a refrigerant receiver and which is locked relative to said pipes by the use of a normal part of the refrigerant receiver, namely, a strap which secures a filter to a refrigerant pipe.

A further object of the present invention is to provide an improved adsorbent device for a refrigerant receiver which is positioned in spaced relationship to the receiver wall in an unique manner incidental to mounting the adsorbent device in its operative relationship, thereby obviating the possibility of damage to the adsorbent device from the heating of the receiver wall when its top is welded thereto. Other objects and attendant advantages of the present invention will readily be perceived hereafter.

The present invention relates to an adsorbent device comprising a casing, adsorbent in said casing, and a relatively small tab means extending outwardly from said casing and having an aperture therein for receiving a strap secured to a pipe in a refrigerant receiver. The various aspects of the present invention will be more fully understood when the following portions of the specification are read in conjunction with the accompanying drawings wherein:

BRIEF DESCRIPTION OF THE DRAWINGS

FIG. 1 is a perspective view of the improved adsorbent device of the present invention;

FIG. 2 is a fragmentary cross sectional view taken substantially along line 2—2 of FIG. 3 and showing the adsorbent device in mounted position within a refrigerant receiver or accumulator;

FIG. 3 is a cross sectional view taken substantially along line 3—3 of FIG. 2;

FIG. 4 is an enlarged fragmentary cross sectional view taken substantially along line 4—4 of FIG. 2 showing the structure for securing the tab of the adsorbent device relative to a refrigerant pipe;

FIG. 5 is a fragmentary cross sectional view taken substantially along line 5—5 of FIG. 4 and showing details of the strap structure;

FIG. 6 is a fragmentary cross sectional view taken substantially along line 6—6 of FIG. 4 and showing details of the strap structure; and FIG. 7 is a diminutive side elevational view of an alternate form of receiver housing in which the adsorbent device of the present invention can be mounted.

DESCRIPTION OF THE PREFERRED EMBODIMENTS

The improved adsorbent device 10 is shown in perspective in FIG. 1 and in mounted relationship in FIG. 2 within the refrigerant receiver or accumulator 11 of an automotive air conditioning system. As is well understood, but not shown in the drawings, the air conditioning system includes a compressor, the output of which is conducted to a condenser and then to an expansion valve and then to an evaporator and then to accumulator 11 and then back to the compressor. An air conditioning system of this type is shown in U.S. Pat. No. 4,291,548 which is incorporated herein by reference.

Accumulator or receiver 11 includes a cylindrical wall 12, a bottom wall 13 and a top wall 14 which is secured to wall 12 by means of welded seam 15. Conduit 16 is mounted in sealed relationship with cover 14 at 17 and conducts a mixture of liquid and gaseous refrigerant to receiver 11 from the evaporator. The refrigerant enters receiver 11 from the lowermost portion 16' of pipe 16. Mounted within receiver 11 is a U-shaped pipe 19 having parallel leg portions 20 and 21 connected by a bottom bend portion 22. The upper portion of leg 20 is mounted in sealed relationship with cover 14 at 23, and portion 24 of pipe 19 leads to the air conditioning compressor. The top of pipe leg 21 is open at 21' to receive the gaseous refrigerant in receiver 11.

The bottom bend 22 includes an aperture 25 therein for receiving conduit 26 leading from filter 27. In this respect, it is conventional in the art to have a filter, such as 27, mounted in the disclosed location to filter liquid, such as oil, entering bend 22 of pipe 19. Filter 27 has a frame 28 of cylindrical outline formed of molded plastic which includes a circular end disc 29 connected to circular end disc 30 by means of a plurality of ribs 31. A cylindrical screen 32 is positioned as shown. Conduit 26 is formed integrally with circular end disc 30. Also formed integrally with circular end disc 30 are flexible strap portions 33 and 34 which are adapted to encircle pipe portion 22. Snap structure 36 connects strap portions 33 and 34 to each other to secure filter 27 in position. Strap portion 34 includes internally molded fingers 37 and 39 which extend laterally therefrom. A barb 40 extends downwardly from finger 37 and a barb 41 extends upwardly from finger 39. An integral prong 43 extends outwardly from strap portion 33 and is received (FIG. 5) between fingers 37 and 39. A groove 44 receives barb 40 and a groove 45 receives barb 41 after barbs 40 and 41 have slid over surfaces 48 and 46, respectively, of prong 43. Groove 44 extends from side 47 to centerline 49 and groove 45 extends from side 50 to centerline 49. The structure thus far disclosed, except for adsorbent device 10 does not constitute any part of the present invention.

The improved adsorbent device 10 is mounted in contiguous relation to and spans substantially parallel pipe portions 20 and 21. Adsorbent device 10 includes a casing 51 which has a semi-cylindrical porous wall 52 with integral ends 53 and 54 formed as shown, but wall 52 may have any other desired curvature which will achieve the intended function. Casing 51 also includes a porous slightly curved substantially planar wall 55. The outer edges of walls 52 and 55 are secured to each other by electrostitched seam portions 56, 57, 59 and 60 which form a continuous fused rim. The seam may be formed in any other suitable manner and need not be restricted to electrostitching.

As can be seen from FIG. 3, spaced portions 61 and 62 of semi-cylindrical wall 52 lie in contiguous relationship to refrigerant pipes 20 and 21 which have axes which lie in a plane. The central portion of wall 52 between spaced portions 61 and 62 is located between pipes 21 and 22 to prevent the casing 51 from moving laterally in a plane which contains the axes of pipes 21 and 22. The lower end 16' of pipe 16 lies in contiguous relationship to wall 55. Thus, adsorbent device 10, in the installed position of FIG. 2, lies between pipes 20 and 21, on one hand, and lower portion 16' of pipe 16, on the other hand.

A tab 64 is formed integrally with and as an extension of wall 52 and 55. Edges 65 and 66 of tab 64 are fused by electrostitching of the material which is the extension of walls 52 and 55, and thus sides 64 and 65 in essence comprise a continuation of fused seam 59. Portions 67 and 69 of tab 64 also comprise fused layers of material formed by electrostitching. The only unfused portion of tab 64 is at 70. Thus, portions 59, 65, 66, 67 and 69 constitute a continuously fused portion. An aperture 71 is located in tab 64 as shown. The fused portions of tab 64 cause the tab to be much stiffer than the sheet material from which it is formed, and this stiffness enhances the ease with which the subsequent assembly operation can be performed.

After adsorbent device 10 and filter 27 have been positioned, as shown in FIG. 4, fingers 37 and 39 are slipped through aperture 71 to the position shown in FIGS. 2 and 4. Thereafter, prong 43 is engaged with barbs 40 and 41 to assume the position shown in FIG. 4 to thereby anchor tab 64 relative to pipe bend 22. It can thus be seen that adsorbent device 10 is held along its sides by pipes 20 and 21, is held at its upper end by pipe portion 16' and is anchored at its lower end by tab 64 which is secured to pipe bend 22. It will be appreciated, if desired, that in installations where straps, such as 33 and 34, are not used to attach filter 27, a separate strap may be used in conjunction with a tab of the type shown at 64 to anchor a lower portion of casing 51 to a pipe, such as bend 22.

The material from which adsorbent device 10 is made is preferably a thermoplastic sheet material, such as felted polyester, which can have the edges fused in the above described manner. By way of example and not limitation, a felted polyester which has been used is between 0.065 and 0.097 inches thick and has a weight of about 9 ounces per square yard. It will be appreciated that other polyesters of different thickness and other types of construction, such as spun bonded, may be used. It will also be appreciated that casing 51 may be made out of any other suitable material which is porous.

Such materials may be plastic or natural fibers. While walls 52 and 55 were attached to each other by electrostitching, it will be appreciated that they may be joined by any other type of fusion, gluing, stitching or in any other suitable manner. The adsorbent 18 in adsorbent device 10 may selectively include, without limitation, adsorbents, such as silica gel, metal, alumino silicate, alumina, calcium sulfate, activated charcoal, molecular sieve, or any other desired compound in bead, pellet or granular form. However, for the present application in an automotive air conditioner, the molecular sieve is preferred.

If desired, the portion of wall 55, which is located adjacent to pipe portion 16', may be reinforced with an extra layer of material, such as 63, suitably secured thereto to prevent the forming of a hole in wall 55 by abrasion by pipe portion 16'.

In FIG. 7 a modified form of refrigerant receiver 11' is shown. In this receiver the upper portion 14' has a greater height than upper portion 14 of FIG. 2 and lower portion 12' has a lesser height than lower portion 12 of FIG. 2. Portions 12' and 14' are joined by welding at a seam, such as 15'. Aside from the foregoing differences the embodiment of FIG. 7 is identical to the embodiment of FIGS. 1–6.

It is to be noted from FIG. 3 that pipe portions 20, 21 and 16' and the attachment at tab 64 maintains device 10 in the FIG. 3 position during the time that seams 15 and 15' are welded in FIGS. 2 and 7, respectively, thereby keeping the fusible material of casing 51 away from the heated well portions of the receiver.

While preferred embodiments of the present invention have been disclosed, it will be appreciated that the present invention is not limited thereto, but may be otherwise embodied within the scope of the following claims.

What is claimed is:

1. In a refrigerant receiver having a receiver axis and an U-shaped pipe therein with two substantially parallel legs each having a leg axis substantially parallel to said receiver axis and connected by a lower pipe portion, and also having a second pipe spaced from a first plane containing said leg axes and having a portion lying between a pair of second planes substantially perpendicular to said first plane and with each of said second planes containing one of said leg axes, an adsorbent device comprising a casing, adsorbent in said casing, a first wall on said casing, first spaced wall portions on said first wall for placement in contiguous relationship to said parallel legs, and a second wall portion located between said first spaced wall portions and positioned between said two substantially parallel legs and protruding into the space between said parallel legs a greater amount than said spaced wall portions, whereby said adsorbent device is limited in its lateral movement transverse to said receiver axis by said substantially parallel legs, a second wall on said casing on the opposite side of said casing from said first wall for placement in contiguous relationship to said second pipe so that a portion of said casing is located between said substantially parallel legs of said U-shaped pipe and said second pipe, whereby said adsorbent device is limited in its lateral movement transverse to said receiver axis by said substantially parallel legs and said second pipe, tab means on said casing for placement proximate said lower pipe portion, and securement means for securing said tab means to said lower pipe portion, whereby said adsorbent device is limited in its movement relative to said lower pipe portion in the direction of said receiver axis.

2. In a refrigerant receiver as set forth in claim 1 wherein said securement means comprises a strap member.

3. In a refrigerant receiver as set forth in claim 2 wherein said lower pipe portion has a lubricant aperture therein and wherein said strap member is a part of said receiver for securing a filter in contiguous relationship to said aperture.

4. In a refrigerant receiver device as set forth in claim 3 wherein said tab means comprises an extension of said casing.

5. In a refrigerant receiver as set forth in claim 2 wherein said tab means comprises a planar rectangular member formed integrally with said first and second walls.

6. In a refrigerant receiver as set forth in claim 2 wherein said tab means includes an aperture for receiving said strap member.

7. In a refrigerant receiver as set forth in claim 6 wherein said aperture is approximately one half the size of said tab means.

8. In a refrigerant receiver as set forth in claim 6 wherein said casing comprises a substantially semi-cylindrical wall portion and a substantially planar wall portion, and wherein said tab means comprises an extension of at least one of said wall portions.

9. In a refrigerant receiver as set forth in claim 8 wherein said tab means comprises an extension of both of said wall portions.

10. In a refrigerant receiver as set forth in claim 9 including means securing said semi-cylindrical wall portion and said planar wall portion to each other, and wherein said extension of said wall portions includes fused extensions of said wall portions.

11. In a refrigerant receiver as set forth in claim 1 wherein said first wall is substantially semi-cylinderical, and wherein said second wall is substantially planar.

12. In a refrigerant receiver as set forth in claim 11 wherein said securement means comprises a strap for encircling said lower pipe portion.

* * * * *

UNITED STATES PATENT AND TRADEMARK OFFICE
CERTIFICATE OF CORRECTION

PATENT NO. : 4,464,261

DATED : August 7, 1984

INVENTOR(S) : John S. Cullen, Samuel A. Incorvia & James A. Vogt

It is certified that error appears in the above-identified patent and that said Letters Patent are hereby corrected as shown below:

Column 5, line 13 (claim 4), cancel "device".

Signed and Sealed this

Twenty-seventh Day of November 1984

[SEAL]

Attest:

GERALD J. MOSSINGHOFF

Attesting Officer     Commissioner of Patents and Trademarks